United States Patent
Mathur et al.

(10) Patent No.: US 10,963,307 B2
(45) Date of Patent: Mar. 30, 2021

(54) CLIENT-SIDE MEMORY MANAGEMENT IN COMPONENT-DRIVEN CONSOLE APPLICATIONS

(71) Applicant: salesforce.com, inc., San Francisco, CA (US)

(72) Inventors: Ashraya Raj Mathur, Fremont, CA (US); Wei Fang, Davis, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/378,374

(22) Filed: Apr. 8, 2019

(65) Prior Publication Data

US 2020/0319930 A1  Oct. 8, 2020

(51) Int. Cl.

| G06F 9/50 | (2006.01) |
|---|---|
| G06F 12/06 | (2006.01) |
| G06F 3/0484 | (2013.01) |
| G06F 12/0891 | (2016.01) |
| G06F 12/123 | (2016.01) |

(52) U.S. Cl.
CPC .......... *G06F 9/5016* (2013.01); *G06F 3/0484* (2013.01); *G06F 12/0646* (2013.01); *G06F 12/0891* (2013.01); *G06F 12/123* (2013.01)

(58) Field of Classification Search
CPC .. G06F 9/5016; G06F 12/0811; G06F 11/073; G06F 12/0238; G06F 12/0815; G06F 12/084; G06F 12/0868; G06F 12/0873; G06F 13/1668; G06F 16/1837; G06F 16/252; G06F 16/957; G06F 16/9574; G06F 2201/885; H04L 67/10; H04L 67/22; H04L 67/025; H04L 67/1008; H04L 67/14; H04L 67/148; H04L 67/18; H04L 67/2804; H04L 67/2842; H04L 67/2847
See application file for complete search history.

(56) References Cited

U.S. PATENT DOCUMENTS

| 5,577,188 A | 11/1996 | Zhu |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

*Primary Examiner* — Phuong H Nguyen

(74) *Attorney, Agent, or Firm* — Jaffery Watson Mendonsa & Hamilton LLP

(57) ABSTRACT

Embodiments regard client-side memory management in component-driven console applications. An embodiment of one or more storage mediums include instructions for performing processing of a console application on an apparatus, including downloading records from a server for a set of one or more of multiple workspaces and opening the set of workspaces in response to request by a user, and switching an active workspace from a first workspace to a second workspace of the plurality of workspaces in response to a request from the user; monitoring memory usage for the plurality of workspaces and monitoring a state of the console application; and managing the memory allocation for the console application based at least in part on the monitored memory usage and console application state.

20 Claims, 13 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2017/0168959 A1* | 6/2017 | Dodonov ............ G06F 16/9574 |

* cited by examiner

CLIENT-SIDE MEMORY MANAGEMENT IN COMPONENT-DRIVEN CONSOLE APPLICATIONS

TECHNICAL FIELD

Embodiments relate to techniques for computer operations. More particularly, embodiments relate to client-side memory management in component-driven console applications.

BACKGROUND

In a client computer operation in which a user may utilize data from a server for multiple records, the records may represent multiple different projects. Further the user may be allowed to address the records in an overlapping fashion, the user may be allowed to switch back and forth between the projects, such as by choosing a tab in a browser window, and to add additional records for additional projects.

In order to maximize performance for the user, the record data from the server may be rendered in memory at the client side as the user being required to download the record data from the server with each switch between records would create significant and noticeable delays for a user waiting for the needed data to be received.

Loading all record data from each project that a user is accessing during a session may not be practical or possible. A system may also allow for caching of certain data, with varying speed and capacity, but caching also has limitations. There may not be sufficient memory to allow for loading and/or caching of such data, and attempts to go beyond certain limitations could ultimately result in a crash of the system. For this reason, the amount of data that may be maintained on a client-side system will be limited, which results in questions regarding what and how much data is to be rendered or to be cached. However, different users may have different records to address, different workflow needs, and different operational styles, and thus the data choices that are made will affect the experiences of different users in different ways.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
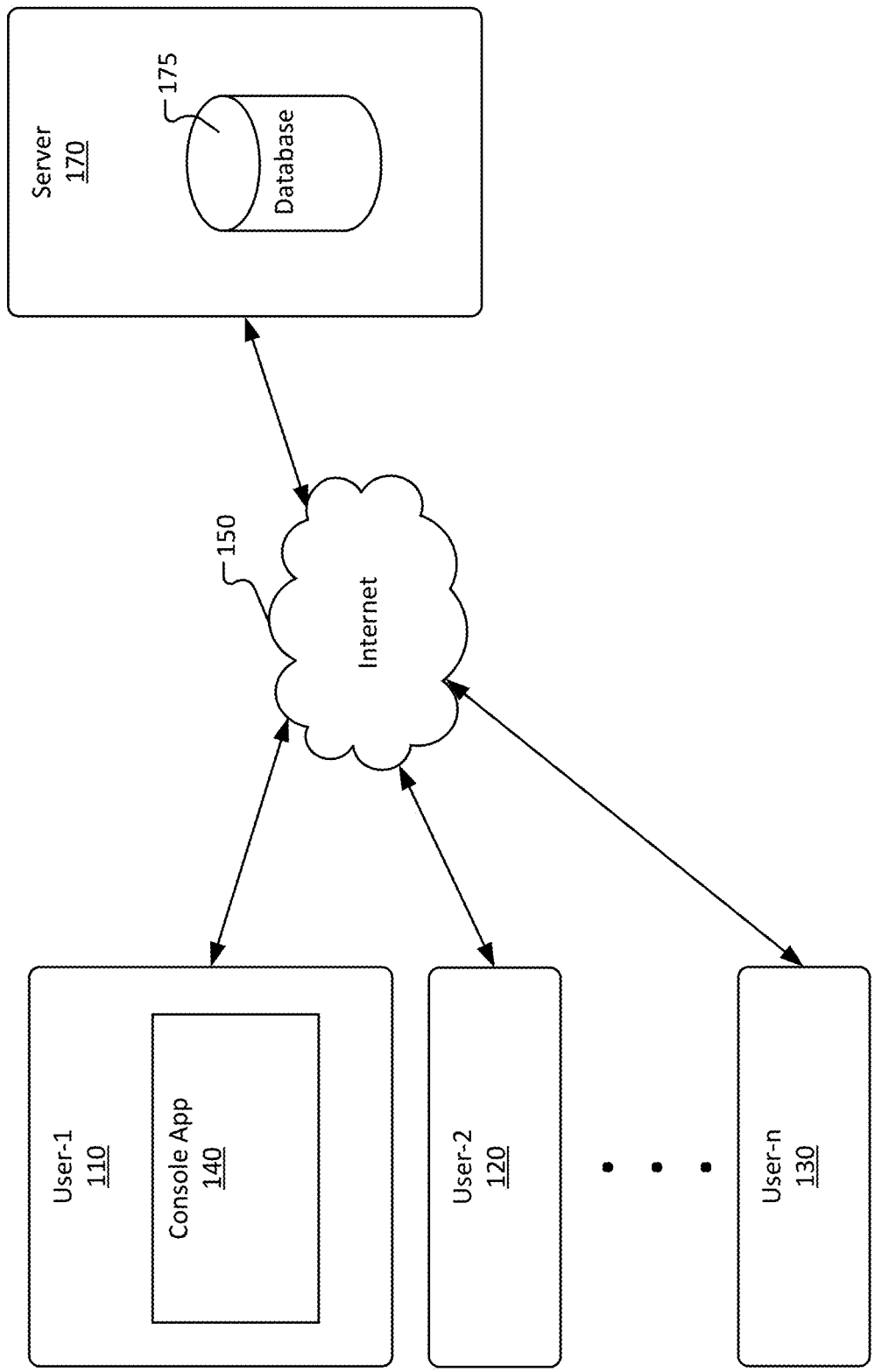
FIG. 1 is an illustration of client-side memory management in a component-driven console application, according to some embodiments.

In the following description, numerous specific details are set forth. However, embodiments may be practiced without these specific details. In other instances, well-known circuits, structures and techniques have not been shown in detail in order not to obscure the understanding of this description.

In some embodiments, an apparatus, system, or process is to provide for client-side memory management in component-driven console applications in heterogeneous workspaces.

Certain applications allow a user to edit and reference multiple workspaces by switching between such workspaces. The workspaces may represent various kinds of projects. In a particular example, an application may be a console application, such as an application generated using Salesforce Lightning Console Applications. High Velocity Sales is a variant of Salesforce Lightning console application which aims at providing a streamlined solution tailored to inside sales teams to speed up the sales process. The console application may, for instance, allow users to edit and reference multiple workspaces at once. In this example, when a user chooses a record from a list, a workspace opens as a workspace tab in the console. When a user opens a related record, the related record then opens as a workspace subtab. The console application is to remember tabs and subtabs, so that when a user navigates away from a workspace, the user is not required to lose time reopening tabs when returning to the previous record. As used herein, an active workspace is a workspace a user has opened and is currently addressing, while an inactive workspace refers to any other open workspace. The user may switch from, for example, a first active workspace to a second workspace, wherein the second workspace is then active, and the first workspace is inactive.

The workspace records for the console application are obtained (downloaded) from the server, and are cached for the use of the user. While the most responsive operation would result if all record data is rendered for the user (i.e., the workspace component is persisted in memory), the memory available for data is limited, and will be exceeded if the user opens a large number of records. It may be expected that a user will spend more time with certain workspace records than others, and thus the requirement will not be equal for all workspaces, but this will depend on the user and the circumstances of the moment. Thus, console applications present a particular challenge to balance the memory versus time trade-off to provide for a stable consistent console experience.

In some embodiments, an apparatus, system, process is to manage application memory usage on a user's browser or other user interface to meet console application longevity requirements while optimizing for fast page load times. In some embodiments, the memory management for a client console includes:

(a) A memory usage monitoring element or system to monitor and manage memory on a client browser.

(b) A client application state monitoring element or system to monitor a state of the console application.

(c) A caching structure to cache certain records, including fully rendered components, component metadata, component data, and markup, to supplement memory usage. Caching may include full rendering of components in memory (which may be referred to a component cache) and metadata and data caching (which may include caching of both metadata and data, or caching of only metadata). For ease of illustration and discussion, the combination of metadata and data may be referred to as "meta/data" herein.

(d) Memory usage analytics to identify console workspaces to be cleaned up (i.e., removed from memory), wherein the analytics may include a Least Recently Used algorithm or other algorithm to select less used data for removal from memory.

Figure 5:
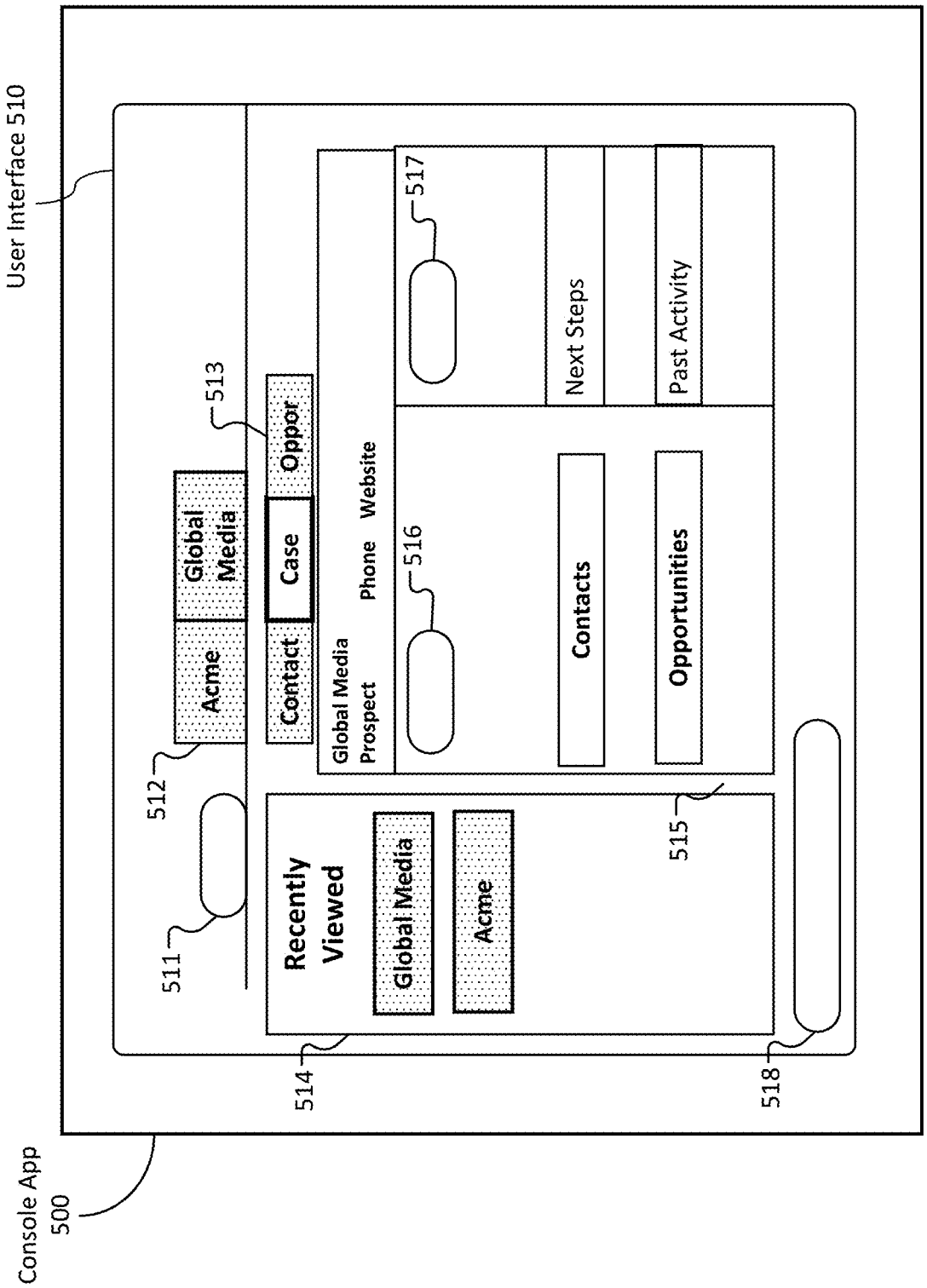
FIG. 5 is an illustration of a user interface screen of a console application that enables a user to edit and reference multiple workspaces, according to some embodiments.

FIG. 1 is an illustration of client-side memory management in a component-driven console application, according to some embodiments. In a system, one or more users, shown as User-1 110, User-2 120, and User-3. may utilize a console application 140, wherein the console application 140 allows a user to open multiple records (such as sales prospect records) and to switch between workspaces representing the open records such as by switching between tabs and/or sub-tabs in the application. An example of a console application for a user is illustrated in FIG. 5. The users exchange data with a server 170 via a network, such as the illustrated Internet 150. The server 170 includes a database 175 for the storing of data records for the users 110-130.

In some embodiments, memory management is provided for each of the client-slide users 110-130 for the console application 140, the memory management providing for balancing of access to records for the users between full rendering of records in memory, metadata and data caching, and downloading of records from the database 175 as required.

Figure 2:
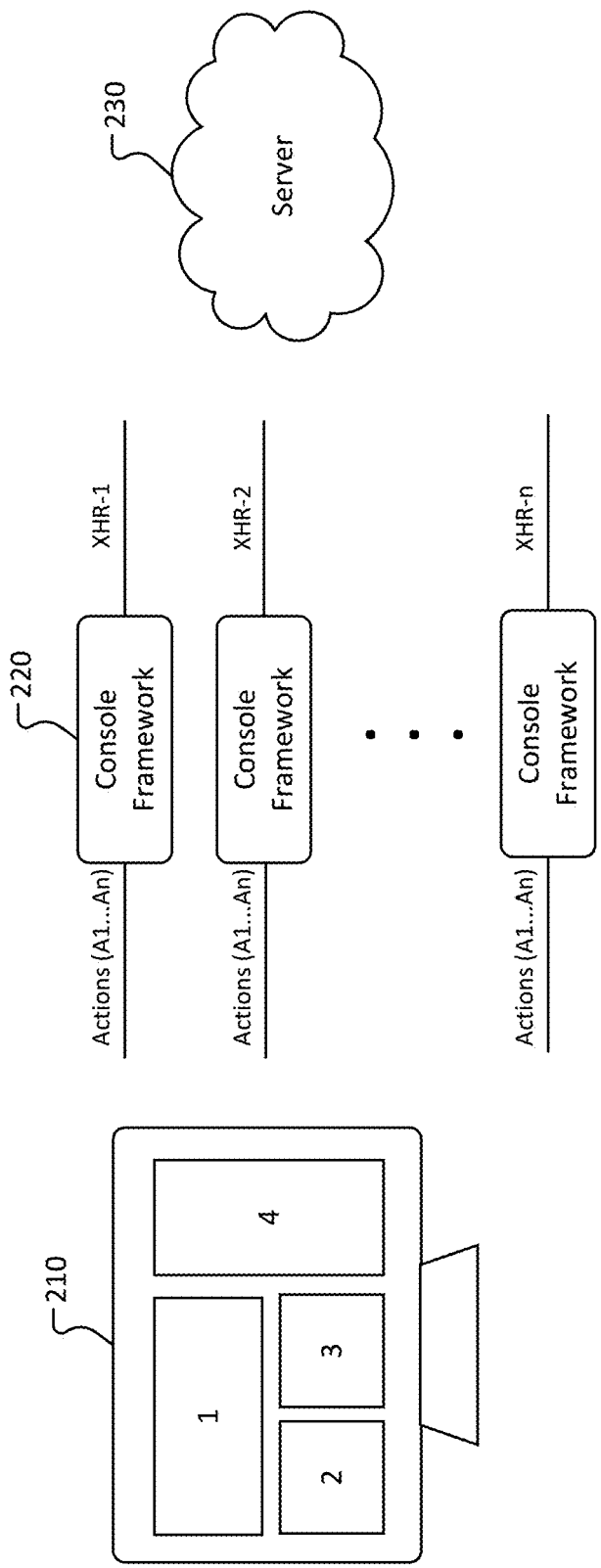
FIG. 2 is an illustration of a component-driven console application, according to some embodiments.

FIG. 2 is an illustration of a component-driven console application, according to some embodiments. As illustrated in FIG. 2, an application page 210, such as for a user utilizing a console application as shown in FIG. 1, is composed of multiple components. Each component can request information from a server 230 using "server actions" and each component can have multiple server actions via an application framework 220 to deliver the "component view" to the user. In a default state, multiple actions may be batched into an XHR (XMLHttpRequest, which is an API (Application Programming Interface) that provides client functionality for transferring data between a client and a server). A page can have multiple XHRs to deliver the "page view" to the user.

Figure 3:
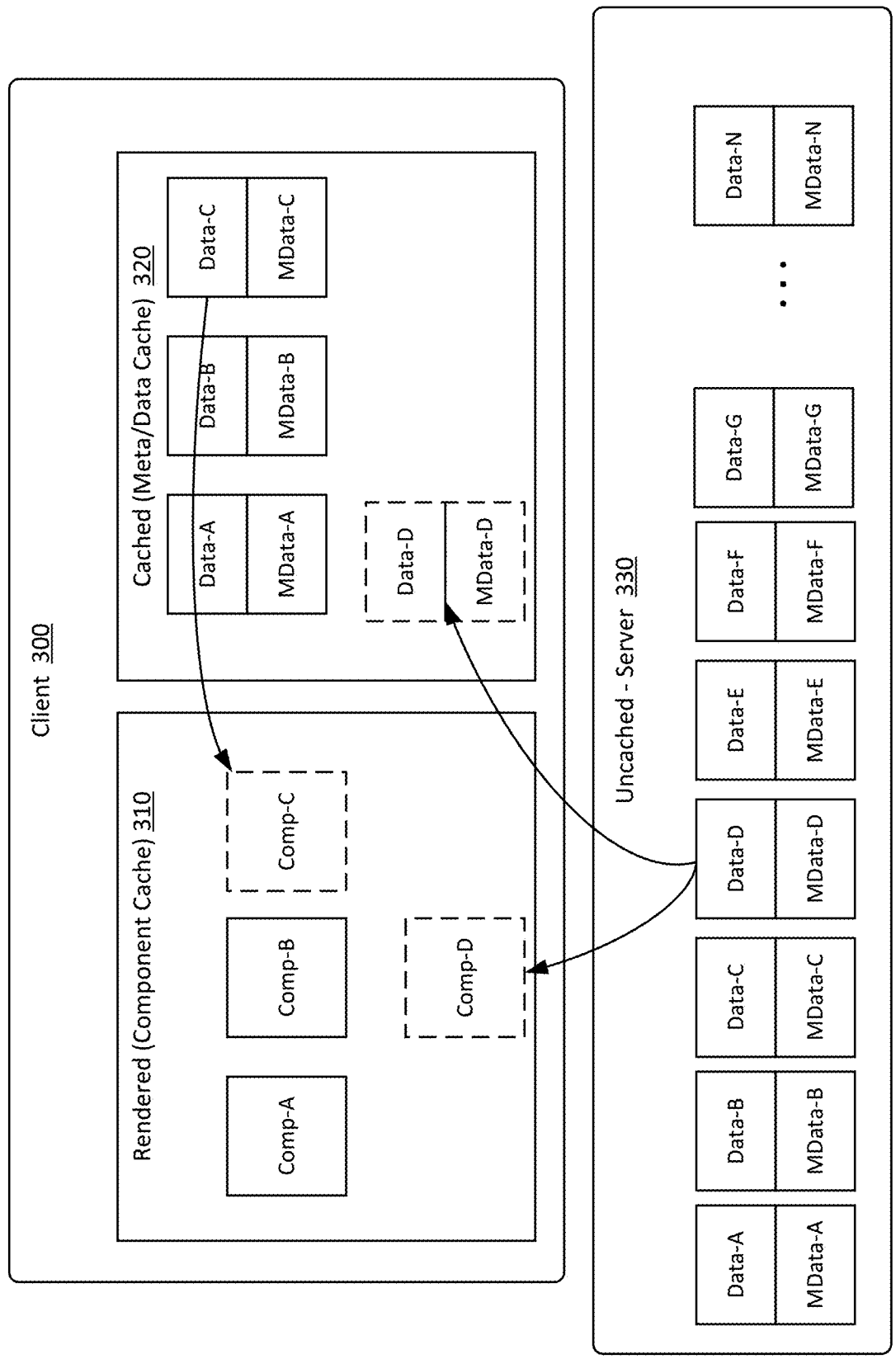
FIG. 3 is an illustration of client-side memory management of records in a component-driven console application, according to some embodiments.

FIG. 3 is an illustration of client-side memory management of records in a component-driven console application, according to some embodiments. In some embodiments, a client 300, such as one or more of the users 110-130 illustrated in FIG. 1, includes a component cache 310 (to hold application components) and a meta/data cache 320 (to hold metadata and data) to serve operations including a console application. The client 300 may receive data records for the console application from a server 330, such as from the database 175 of server 170 illustrated in FIG. 1.

In some embodiments, a memory management architecture for the client 300 provides multiple memory and caching options to provide performance and user experience benefits within memory constraints for the console application. In some embodiments, the memory management architecture includes the following memory and caching options for each workspace of a user:

(1) Full Rendering: A console workspace is fully rendered, i.e. is cached as a component in a component cache, on the client and is persisted in-memory. Full rendering is the most expensive from a memory usage perspective but provides an optimal operation for the records that are open from a user experience perspective as there will be nearly instant loading times.

FIG. 3 illustrates full rendering of certain workspaces, the rendered workspaces being Component-A (rendered utilizing Data-A with Metadata-A), Component-B (Data-B with Metadata-B). These records thus are very quickly or immediately available when the client switches between the workspaces, without requiring loading of data from the meta/data cache 320 or the server 330.

(2) Meta/Data Caching: In this instance the console workspace data and metadata are cached in the meta/data cache 220. In this instance the console workspace data and metadata are available in the meta/data 320 (and thus do not need to be obtained from the server 330) but the workspace is not fully rendered in memory. Rather, the workspace will be rendered from the cached metadata and data when there is a switch to a cached record. Metadata and data caching is less expensive than full rendering from a memory usage perspective, but is less optimal from a user experience perspective because of the brief delay in loading times.

FIG. 3 illustrates caching of certain workspaces, the workspaces including Record-C(Data-C with Metadata-C). Thus, the metadata and data for an additional workspace (Component-C) can be retrieved quickly from cache, but such records are not immediately available when the client switches between the records. FIG. 3 illustrates the rendering of Component-D in the component cache 310 from the metadata and data obtained from the meta/data cache 320.

In some embodiments, there may additionally be circumstances in console workspace metadata is available in the meta/data cache 320 but the data needs to be fetched from the server 330. The workspace will be rendered after the data fetch is completed from the server. This option provides further savings in memory consumption in comparison with data and metadata caching, but is more expensive from a time perspective for a user.

(3) Uncached: In an uncached state for a workspace, no metadata or data is cached for a workspace. For this reason, all information for the workspace is fetched from the server to construct and render the workspace. In this way no memory consumption is required for a record, but this option is the most expensive from a performance and user experience perspective.

FIG. 3 illustrates certain workspaces that are available from the database 330, the workspaces including data for Component-A (Metadata-A and Data-A in the server 330) through Record-N(Metadata-N and Data-N in the server 330). These records thus can be downloaded from the server when a user switches to the record, but there is additional delay for the downloading of the records, a delay that can be avoided if the record data is either rendered or cached. In a particular example, the metadata and data for Component-D may be obtained from the server, allowing rendering of Component-D and the caching of Metadata-D and Data-D (which may thus be available when Component-D is evicted from the component cache 310 at a later time).

Figure 4:
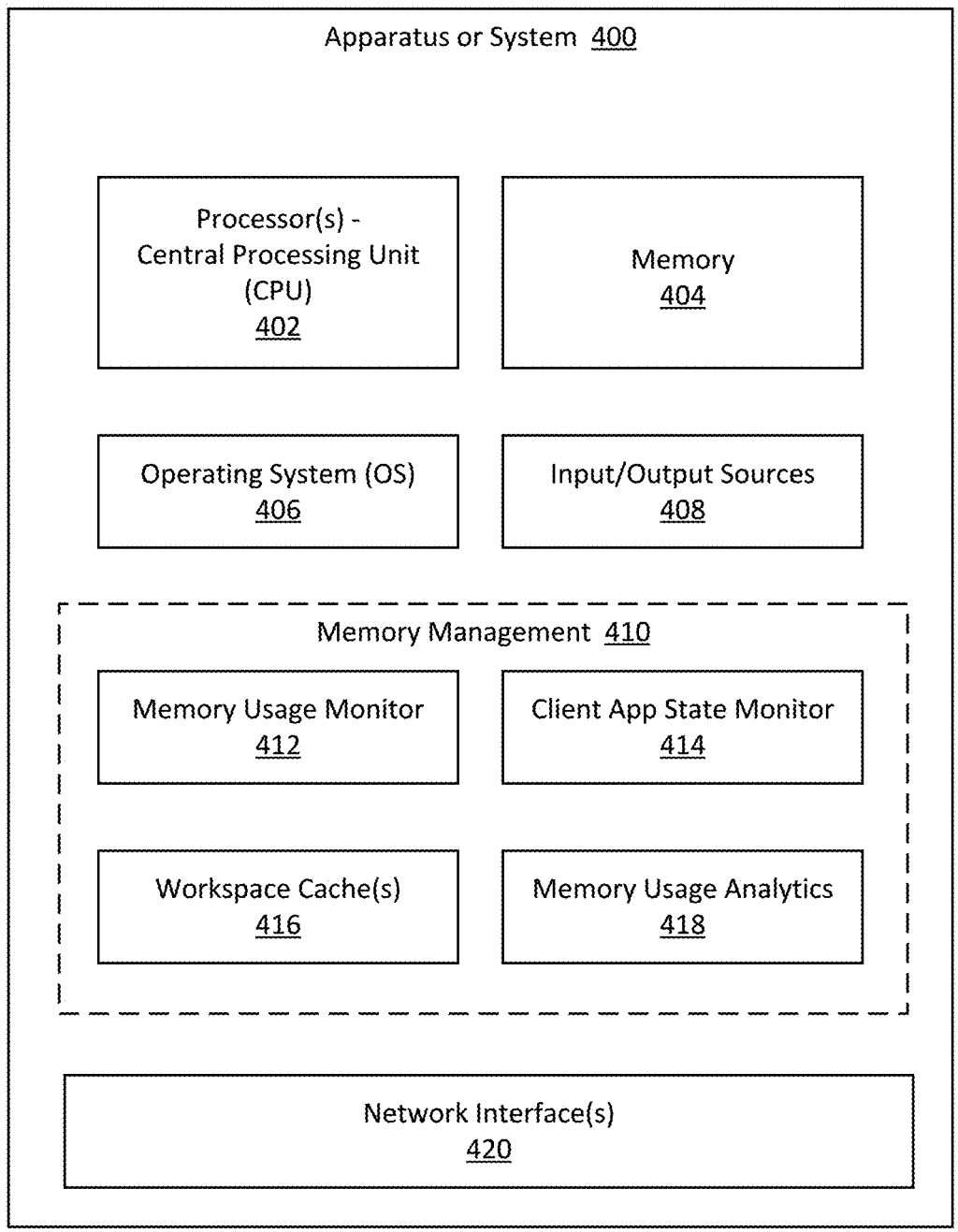
FIG. 4 illustrates an apparatus or system including client-side memory management of records in a console application according to some embodiments.

FIG. 4 illustrates an apparatus or system including client-side memory management of records in a console application according to some embodiments. Apparatus or system 400 represents a communication and data processing device including but not limited to a computer, server, or other apparatus or system. Further, for example, apparatus or system 400 may include a computer platform hosting an integrated circuit ("IC"), such as a system on a chip ("SoC" or "SOC"), integrating various hardware and/or software components of apparatus or system 400 on a single chip.

In some embodiments, the apparatus or system includes memory management 410 to dynamically manage memory utilization of a component-driven console application by applying a heuristic trade-off between established memory and time constraints.

As illustrated, in one embodiment, apparatus or system 400 may include, but is not limited to, one or more processors including a central processing unit 402 ("CPU" or simply "application processor") or other main processing unit, memory 404, network devices, drivers, or the like, as well as input/output (TO) sources 408, such as touchscreens, touch panels, touch pads, virtual or regular keyboards, virtual or regular mice, ports, connectors, etc. Apparatus or system 400 may include an operating system (OS) 406 serving as an interface between hardware and/or physical resources of apparatus or system 400 and a user.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In some embodiments, the dynamically management of the memory utilization of the component-driven console application may be hosted by the memory 404 of the apparatus or system 400. In another embodiment, this may be hosted by or be part of operating system 406 of apparatus or system 400.

It is to be appreciated that a lesser or more equipped system than the example described above may be preferred for certain implementations. Therefore, the configuration of apparatus or system 400 may vary from implementation to implementation depending upon numerous factors, such as price constraints, performance requirements, technological improvements, or other circumstances.

In some embodiments, the memory management 410 of the apparatus or system 400 is to manage application memory usage on a user's browser to provide for console application longevity while optimizing for fast page load times. The application or system may include:

(1) Memory usage monitoring to monitor and manage memory on a client browser, such as performed by memory usage monitor 412 or another similar element.

(2) Client application state monitoring to monitor the state of the console application, such as performed by client application state monitor 414 or another similar element. The client application state monitoring includes monitoring for intervals when the client application is in an idle state.

(3) A workspace caching architecture to store records (including component data and metadata) to optimize memory usage, such as performed by one or more workspace caches 416 or another similar element. In some embodiments, the one or more workspace caches include a component cache and a metadata/data cache, such as the component cache 310 and metadata/data cache 320 of client 300 illustrated in FIG. 3. In some embodiments, the caching architecture may determine whether a workspace is to be cached or removed from the cache based at least in part on the usage of the workspace in the console application, which may include multiple elements, such as how often a workspace is accessed and how long it has been since the workspace has been accessed. For example, records for a workspace may be initially fully cached after removal from the client memory and then may be removed from cache based on lack of access to the records.

(4) Memory usage analytics to identify console workspaces to be cleaned up according to an algorithm, wherein the algorithm may include a Least Recently Used algorithm, such as performed by memory usage analytics 418 or another similar element.

In some embodiments, the memory management 410 utilizes idle-time intervals for memory clean-up operations if memory pressure is detected by the memory monitoring module. In some embodiments, when the memory usage monitor 412 detects memory usage that is above or near to one or more thresholds, the memory management 410 initializes memory clean-up operations. In some embodiments, the client application state monitor 414 monitors for intervals when the client application is idle, and is to schedule the clean-up operations during idle intervals. In some embodiments, the memory usage analytics 418 is to identify data to be removed from active memory (the data to be unrendered) using a Least Recently Used algorithm or other algorithm.

The apparatus or system 300 may further host network interface(s) 420 to provide access to a network, wherein access to the network may provide access to a server, such as server 170 illustrated in FIG. 1, in connection with a console application. The network may include a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) 420 may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

FIG. 5 is an illustration of a user interface screen of a console application that enables a user to edit and reference multiple workspaces, according to some embodiments. In a particular example, a console application 500 including user interface 510 provides support for sales in which each workspace contains information regarding a particular sales target. However, embodiments may include any server records that a user may wish to switch between, and thus such workspaces should be open at the same time to allow quick switching operations.

In this particular example, a user may use an item menu in a navigation bar 511. Records selected from the table list view or split view open as workspace tabs 512. When the user clicks related records from the workspace tab, those records open as subtabs 513. For efficiency and productivity, a split view allows the user to work with a list view while still working on other records 514. The user can close and open split view utilizing the split view pane 515. The user is able to view and update a record using a details area 516 and a feed 518. However, FIG. 5 illustrates one example, and page layouts can be different for each type of record. Further, the console application 500 may provide utilities to provide access to common processes and tools, such as History and Notes 518.

In this example, there are two workspace tabs open—Acme and Global Media. Under the Global Media workspace tab, there are three subtabs open, such as a contact record, a related case, and a related opportunity. In the History utility, the user may recently opened records.

In the console application 500, when a user chooses a record (such as from a list or directory), the record may open as a workspace tab, or may otherwise be opened in a manner that allows for the user to address multiple records. When a record is opened for a first time in a session, it may be expected that the associated data and metadata will be downloaded from a server, such as from database 175 of server 170 illustrated in FIG. 1. The console application remembers the tabs, such that when the user navigates away from a workspace, the user doesn't lose time reopening tabs when the user returns to the workspace.

In operation, there is a tradeoff between memory use and speed of operation. The initial load of a record initializes a workspace tab/sub-tab, such as TAB-A. Typical page speed for the initial workspace tab/sub-tab load may be under 5 seconds. A workspace tab can be initialized in the foreground or in the background (such as by the user selecting either Cmd+Click of/Ctrl+Click with the user's keyboard and mouse or selection unit).

Once any workspace tab/sub-tab is loaded, clicking between the open tabs/sub-tabs is expected by a user to be instantaneous or nearly so. This can be achieved if each loaded workspace is persisted in the browser, but this would require unlimited memory for the browser process.

In a particular example, the console application 500 provides a prioritized task list inside the console. A inside sales representative may be expected to work with, for example, approximately 80-100 leads per day to take the next steps on the sales cadences and build a strong pipeline. It may be assumed that the memory usage per workspace tab/sub-tab (record) may be approximately 20-25 MB.

However, most modern browsers limit the memory usage per process at less than or equal to 1 GM. For example, Chrome v8 has a default memory limit of 512 MB on 32-bit and 1.4 GB on 64-bit systems. Thus, the use of a Chrome browser on a 32-bit system implies a user can open roughly 25 workspace tabs/sub-tabs before running out-of-memory in a Console application, and the use of a Chrome browser on 64-bit system implies that the user can open roughly 50 workspace tabs/sub-tabs may be opened before running out-of-memory in a console application. Open workspace tabs can be limited to these limits, but opening workspace tabs/sub-tabs beyond the limit would not be instantaneous, leading to suboptimal console experience for users.

In some embodiments, the console application 500 includes memory management as illustrated and described for in FIG. 1-4, wherein each workspace may be either fully rendered in memory; fully cached (data and metadata in cache); partially cached (such as metadata being cached and data being available from server); or uncached (data and metadata available from the server).

Figure 6A:
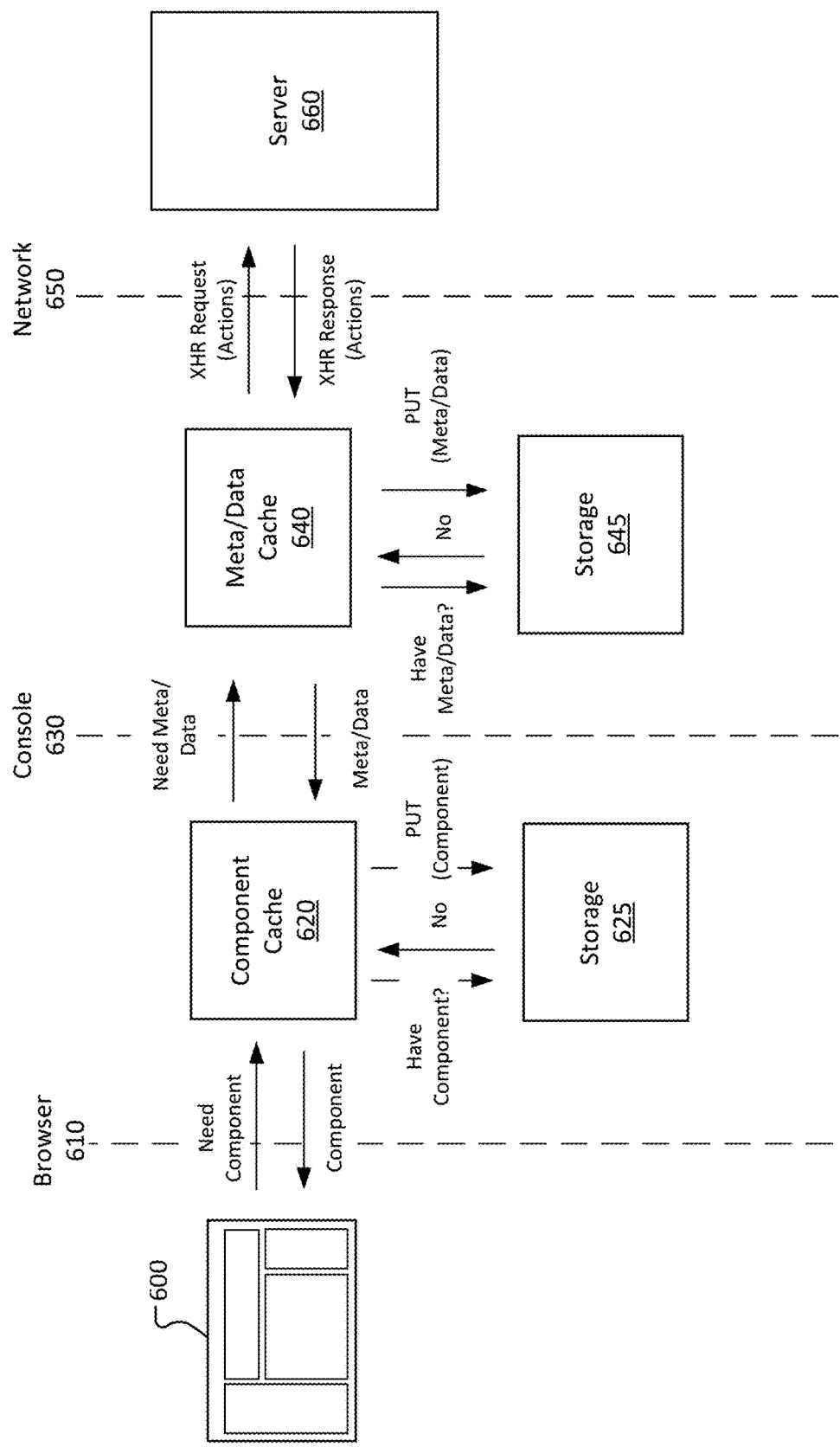
FIG. 6A-6C are illustrations of operations of a component-driven console application in switching between workspaces, according to some operations.
Figure 6B:
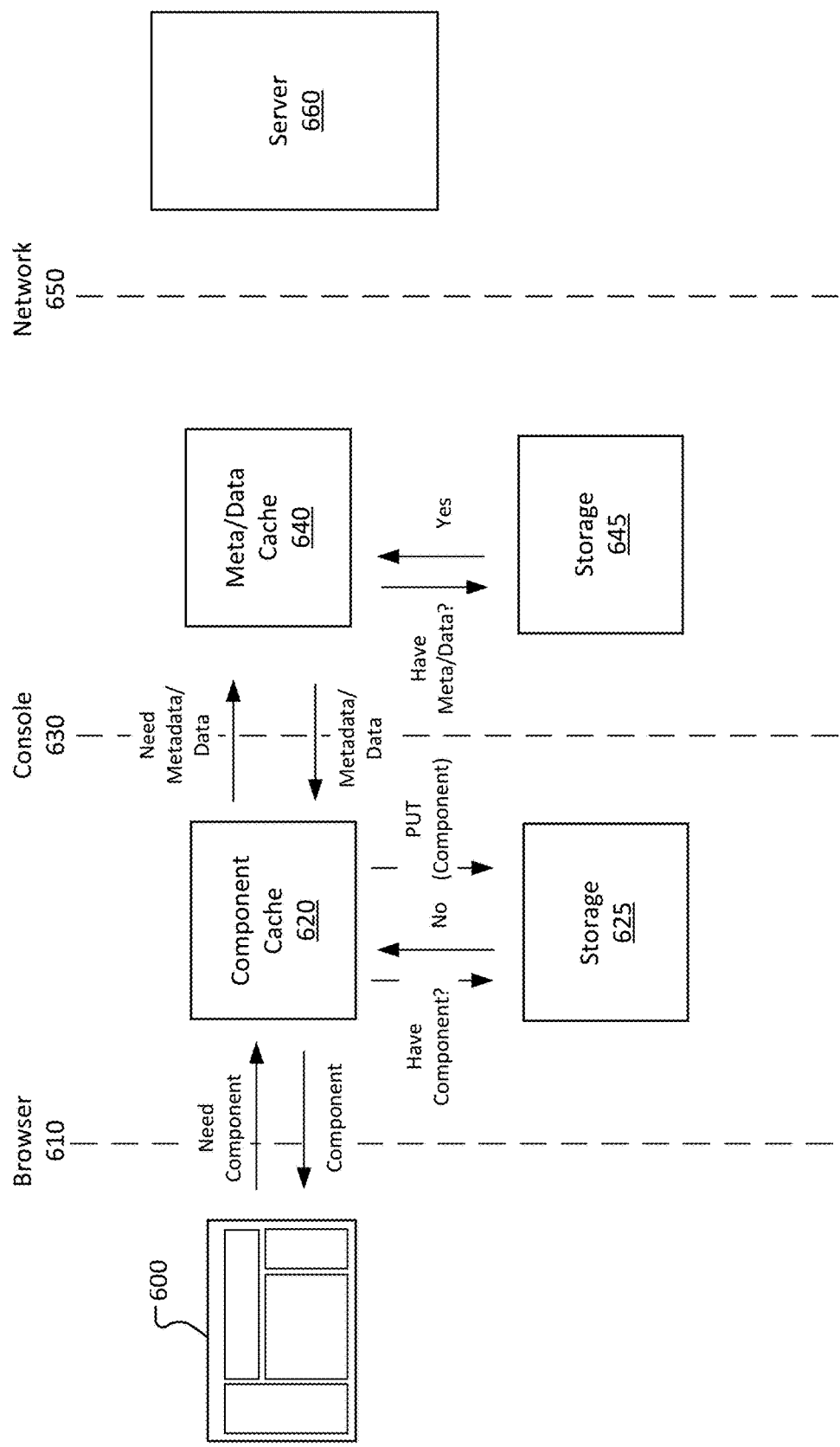
Figure 6C:
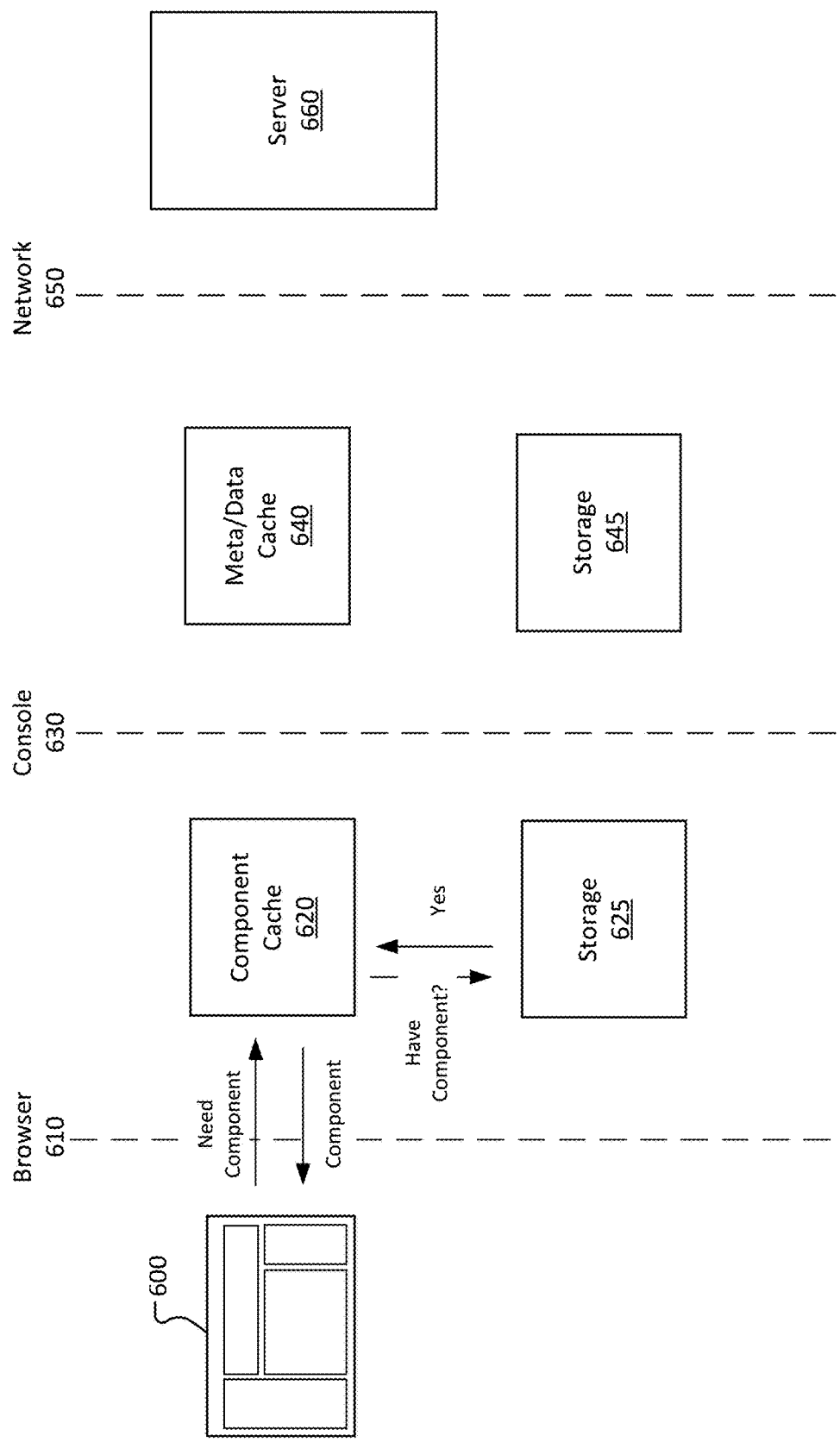

FIG. 6A-6C are illustrations of operations of a component-driven console application in switching between workspaces, according to some operations. FIGS. 6A-6C illustrates the flow of information between a browser 610, a console application caching layer 630 (such as Lightning Data Service), and a network 650 to connect to server 660. When a workspace page (record page) loads in uncached scenarios, the workspace requires the following information:

Meta-data: Page layout, component layout, record type, field type, etc.;

Data: Page data, component data, field data, etc.; and

Component markup: HTML, JS, CSS markup for the components on the page.

As illustrated in FIGS. 6A-6C, a console application implementation may provide operation in the following conditions:

FIG. 6A illustrates the high-level flow of information to render a workspace page (Record Page) in an uncached condition (without caching functionality). In this example, a user may click on a record link from, for example, a table list view or split view to open as workspace tabs. The console application framework is then to:

Request the new workspace information from the component cache 620, illustrated as "Need Component" command via the browser 610 to the component cache, and "Have Component?" inquiry to storage 625. Because the component has not been cached, there is a cache-miss at the component cache layer.

Request the meta-data and data information (collectively called meta/data) from the Meta/Data cache 640 ("Need Meta/Data" via the console 630), and "Have Meta/Data?" inquiry to storage 645. Because the meta/data has not been cached, there is a cache-miss at the meta/data cache layer.

Request the component, data, and meta-data information from the server 660.

Extract the meta/data information and store (PUT) such information the storage 645 for the meta/data cache 640.

Create the component and cache the component in the storage 625 for the component cache 630.

Render the workspace from the component on the workspace page.

The user then can view the Workspace/Record page. Because the uncached workspace page fetches all the information from the server 660 in this example, the performance of loading the page is expensive. There is no memory consumption required to create a workspace in an uncached state, but this is most expensive circumstance from a performance and user experience perspective (resulting in, for example, 3-5s page load times).

FIG. 6B illustrates the high-level flow of information to render a workspace page (Record Page) in a metadata and data cached condition (with caching functionality). In this example, a user may again click on a record link from, for example, a table list view or split view to open as workspace tabs. The console application framework is then to:

Request the new workspace information from the component cache 620, illustrated as "Need Component" command via the browser 610 to the component cache, and "Have Component?" inquiry to storage 625. Because the component has not been cached, there is a cache-miss at the component cache layer.

Request the meta-data and data information (collectively called meta/data) from the Meta/Data cache 640 ("Need Meta/Data" via the console 630), and "Have Meta/Data?" inquiry to storage 645. Because the meta/data has been cached, there is a cache-hit at the meta/data cache layer. Thus, there is no need to obtain data from the server 660.

Create the component and cache the component in the storage 625 for the component cache 630.

Render the workspace from the component on the workspace page.

The user then can view the Workspace/Record page. Because the meta/data cached workspace page fetches all the information from the meta/data cache 640 in this example, the performance of loading the page is less expensive than the uncached state. More memory consumption is required to create a workspace compared to the uncached state, but this is less expensive from a performance and user experience perspective (resulting in, for example, 2-3s page load times).

FIG. 6C illustrates the high-level flow of information to render a workspace page (Record Page) in a component cached (or fully cached) condition (with caching functionality). In this example, a user may again click on a record link from, for example, a table list view or split view to open as workspace tabs. The console application framework is then to:

Request the new workspace information from the component cache 620, illustrated as "Need Component" command via the browser 610 to the component cache, and "Have Component?" inquiry to storage 625. Because the component has been cached, there is a cache-hit at the component cache layer.

Render the workspace from the component on the workspace page.

The user then can view the Workspace/Record page. Because the component cached workspace page fetches all the information from the component cache 620 in this example, the performance of loading the page is less expensive than the meta/data cached state. The console workspace is fully rendered on the client and persisted in memory. This is most expensive from a memory usage perspective, but the most optimal from a performance and user experience perspective (resulting in near instant loading times).

Caching optimizes the following:

Client processing time—Time to create the component from the component markup and meta/data information.

Network processing time—Time to fetch the component markup and meta/data information from the Salesforce server.

Server processing time—Server runtime processing for the detailed information for the component markup and meta/data information.

Figure 7A:
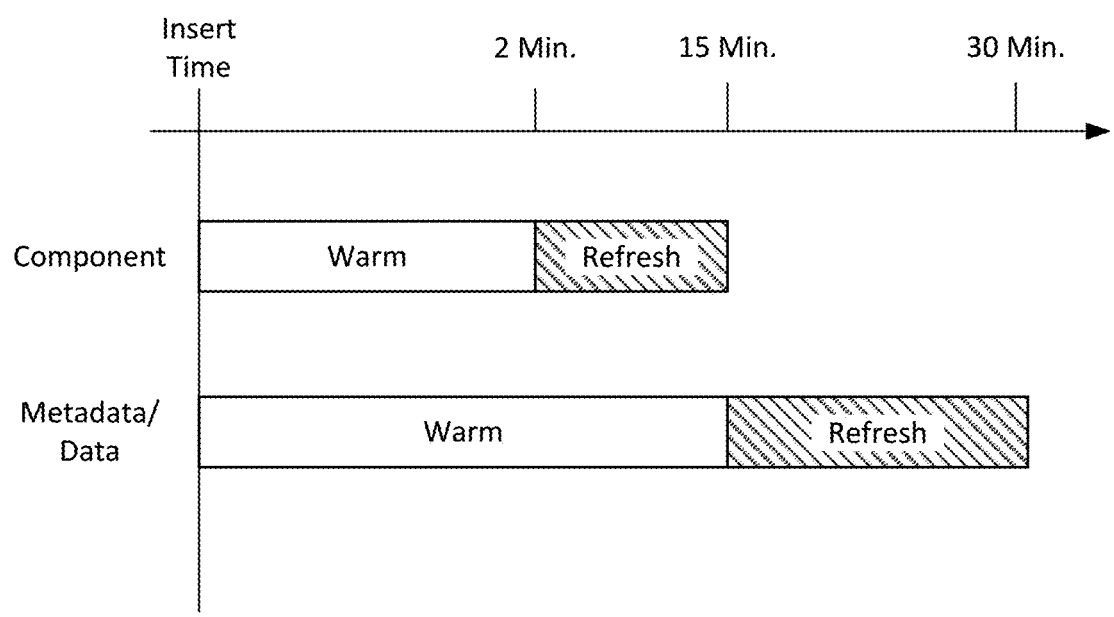
FIG. 7A is an illustration of exemplary caching time-to-live durations in a console application.

FIG. 7A is an illustration of exemplary caching time-to-live durations in a console application. In some embodiments, as the memory utilization of created components is higher than the memory utilization of metadata and data, a time-to-live (TTL) cache duration is established for each cache. Exemplary durations are illustrated in FIG. 7A, wherein:

Component Cache—Each component stored in the component cache is stored up to a first time threshold (up to 15 minutes in the illustrated example) before it is evicted. In some embodiments, during a certain period, such as between 2-15 minutes, the cache checks if there is any newer information to be refreshed from the meta/data cache. If a component is not accessed prior to the expiration of the first time threshold, the component is evicted from the component cache.

Meta/Data Cache—Each set of meta-data and data information is stored up to a second time threshold (up to 30 minutes in the illustrated example) before it is evicted. Between 15-30 mins, the cache checks if there is any newer information to be refreshed from the server. If a set of metadata and data is not accessed prior to the expiration of the second time threshold, the metadata and data are evicted from the meta/data cache.

Figure 7B:
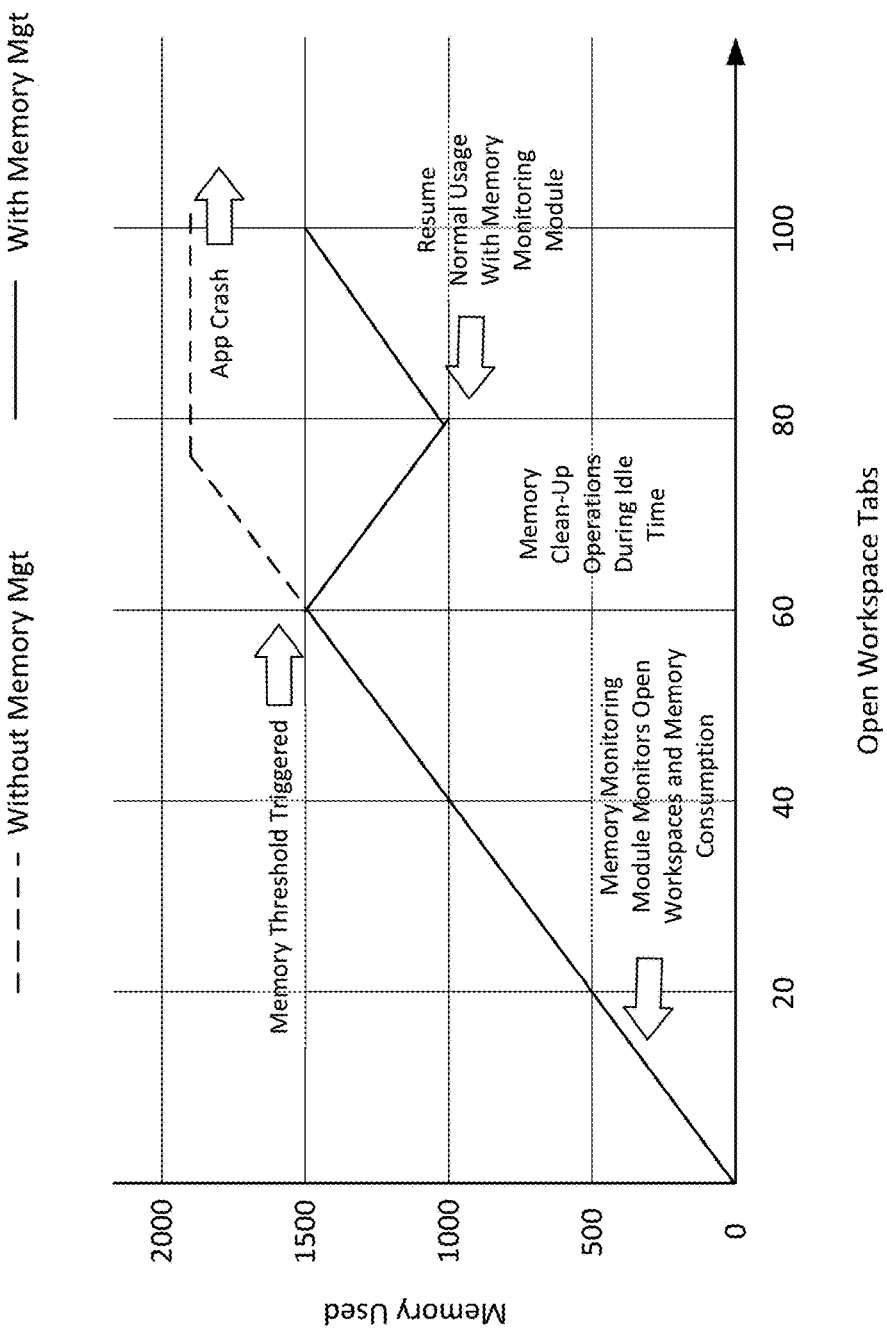
FIG. 7B is an illustration of console memory management according to some embodiments.

FIG. 7B is an illustration of console memory management according to some embodiments. FIG. 7B illustrates the amount of memory used (memory consumptions) for a certain number of workspace tabs for a console application. In some embodiments, a memory management module, such as memory management 410 illustrated in FIG. 4, will monitor open workspace tabs together with and browser memory consumption.

As shown, the amount of memory consumption will continue to climb without memory management, ultimately resulting in an application crash.

In some embodiments, memory management for a console application includes utilizing idle-time intervals for memory clean-up operations if memory pressure is detected by the memory monitoring module. When the memory monitoring module detects the memory consumption reaching or nearing the identified threshold or thresholds, the module will initialize memory clean-up operations.

In some embodiments, a client-idle detection system monitors when the client is idle, and schedules the clean-up operations during idle intervals. In some embodiments, the clean-up operations include:

Identifying the "Least Recently Used" console workspaces using an LRU algorithm.

Keeping X console workspaces in fully-rendered, fully-cached state, wherein the value of X is determined dynamically based on when the workspaces were accessed and memory used by each workspace.

Keeping Y console workspaces in meta/data cached state, wherein the value of Y is determined dynamically based on when the workspaces were accessed and cache memory used by each workspace.

Unrendering and deleting the rest of workspaces (and returning these to the uncached state) for the remainder of the workspaces not meeting the memory threshold constraints.

In some embodiments, the clean-up operations are performed iteratively until memory threshold constraints are met during idle time intervals when the user is inactive. If applicable, the clean-up operations may also be performed while the user is active if the memory utilization increases significantly in a short duration of time (e.g. sudden burst of user activity causing heavy memory consumption and potentially leading to app crashes).

Figure 8:
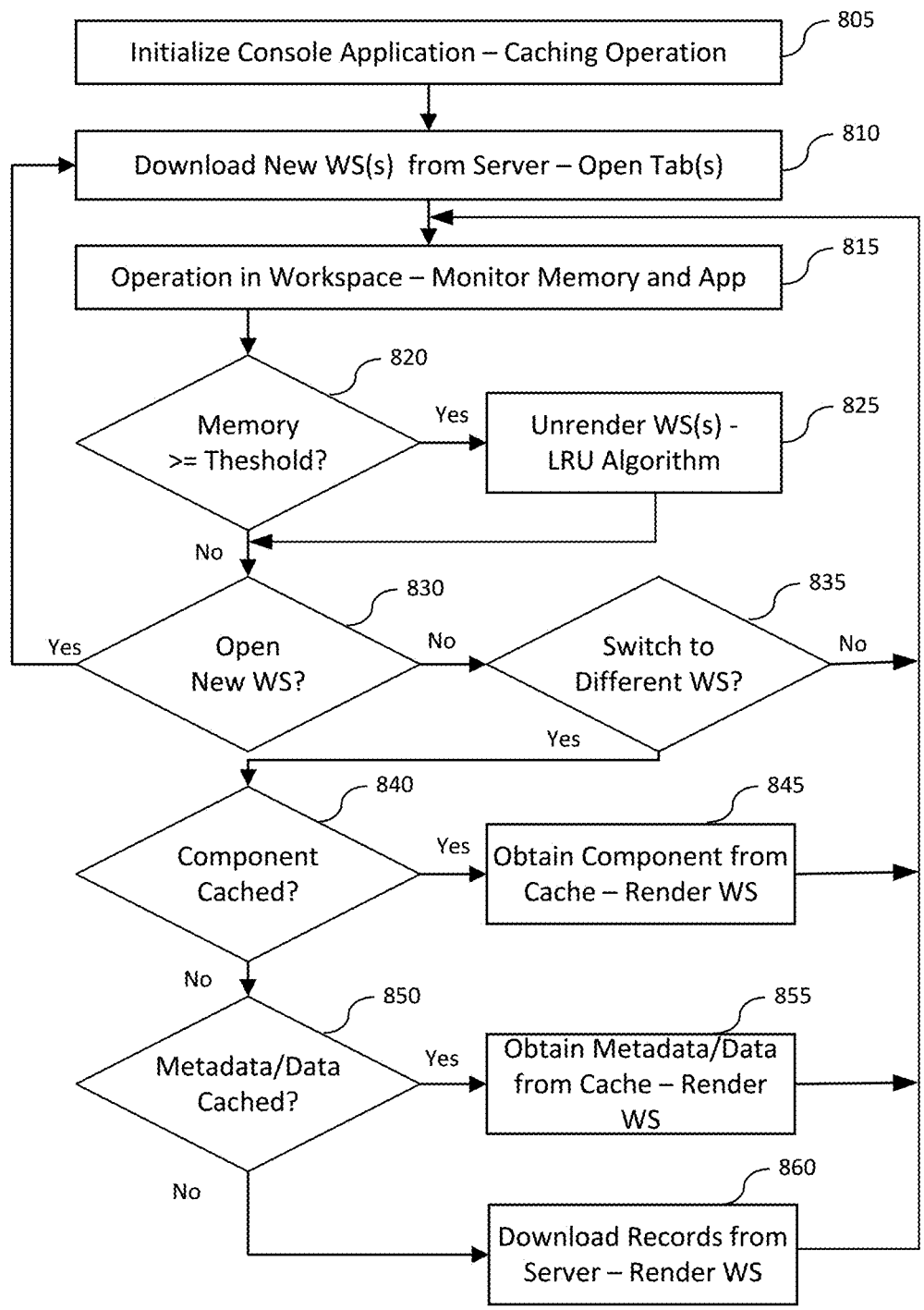
FIG. 8 is a flowchart to illustrate a process for client-side memory management of records in a component-driven console application, according to some embodiments.

FIG. 8 is a flowchart to illustrate a process for client-side memory management of records in a component-driven console application, according to some embodiments. As illustrated in FIG. 8, a process includes initializing a console application 805. Initialization may also include initialization of a caching operation, if this is not already in operation, the caching operation to cache data including records for the console application. The caching operation may include the operations described for workspace cache(s) 416 in FIG. 4.

The process may proceed with opening one or more new workspaces (WS(s)) in response to user request, and to open tabs (or another similar workspace element) for each workspace 810. The process continues with operation in a user selected workspace, and with monitoring memory usage and console application state 815.

In some embodiments, upon the memory usage being greater than or equal to a certain threshold 820, wherein the threshold may be a value that is near a maximum memory usage for the console application, then the process includes cleaning up the workspaces by removing one or more workspaces from memory according to an algorithm, such as a Least Recently User algorithm 825. In some embodiments, the clean up for workspaces may be performed when the monitoring of the application indicates that the application is in an idle state. In some embodiments, the clean up for workspaces may also be performed when the application is in an active state if certain conditions are present, such as when there is a significant increase in memory consumption over a brief period of time.

In some embodiments, the process may continue with a determination whether the user is requesting the opening of a new workspace 830. If so, the records for the new workspace are downloaded from the server, and a new tab is opened for the workspace 810. While not illustrated in FIG. 8, a user may also choose to close one or more workspaces, allowing for removal of one or more tabs and the release of the memory required for the one or more workspaces.

In some embodiments, the process may continue with a determination whether the user is requesting a switch from an active workspace to a different workspace (a workspace for which a tab is already open) 835. If not, the process may continue with operation in current workspace 815. If so, the process proceeds to switch to the different workspace according to the current storage of the workspace records:

If the workspace component is cached (i.e., the workspace is fully cached) 840, then the records are obtained from the component cache for rendering the workspace 845, such as in the scenario illustrated in FIG. 6C.

If the workspace metadata and data are cached (i.e., the workspace is partially cached) 850, then the metadata and data are obtained from the meta/data cache for rendering the workspace 865, such as in the scenario illustrated in FIG. 6B. In some embodiments, there may further be a circumstance in which the component metadata is present in the meta/data cache but the component data is not, and thus only the data needs to be retrieved from the server.

If the workspace metadata and data are not cached 850, then record data for the workspace (metadata and data) is downloaded from the server 860, such as in the scenario illustrated in FIG. 6A.

Following the switch to the workspace, the process then returns to operation in the workspace, with the continued monitoring of the memory usage and application state 815.

The examples illustrating the use of technology disclosed herein should not be taken as limiting or preferred. The examples are intended to sufficiently illustrate the technology disclosed without being overly complicated and are not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Implementations may include:

In some embodiments, one or more non-transitory computer-readable storage mediums having stored thereon executable computer program instructions that, when executed by one or more processors, cause the one or more processors to perform operations including performing processing of a console application on an apparatus, including downloading records from a server for a set of one or more of a plurality of workspaces and opening the set of workspaces in response to request by a user, and switching an active workspace from a first workspace to a second workspace of the plurality of workspaces in response to a request from the user; monitoring memory usage for the plurality of workspaces and monitoring a state of the console application; and managing memory allocation for the console application based at least in part on the monitored memory usage and console application state.

In some embodiments, managing the memory allocation for the console application includes allocating each of the plurality of workspaces into one of the following states: full rendering of a workspace component in memory; caching of at least a portion of metadata and data for the workspace in a cache; or uncached with metadata and data for the workspace to be downloaded from the server.

In some embodiments, the instructions further include determining whether the second workspace is fully rendered, cached, or uncached; and rendering the second workspace from a workplace component in memory if the second workspace is fully rendered, from at least some metadata and data retrieved from the cache if the second workspace is cached, or from metadata and data retrieved from the server if the second workspace is uncached.

In some embodiments, managing the memory allocation of the console application includes determining whether a workspace is to be removed from the memory of the cache.

In some embodiments, the instructions further include performing memory usage analytics to identify one or more of the plurality of workspaces to be removed from the memory or the cache.

In some embodiments, operation of the memory usage analytics is to occur in response to a memory usage for the memory console being greater than or equal to a threshold level.

In some embodiments, the memory usage analytics includes application of a Least Recently Used algorithm.

In some embodiments, the memory usage analytics includes scheduling operations when the console application is in an idle state.

In some embodiments, a system includes one or more processors; a memory to store data, including data for a console application; and a cache memory; wherein the system is to provide memory management for the console application, including the system to download records from a server a set of one or more of for a plurality of workspaces and opening the set of workspaces in response to request by a user, switch an active workspace from a first workspace to a second workspace of the plurality of workspaces in response to a request from the user, monitor memory usage for the plurality of workspaces, monitor a state of the console application, and manage memory usage for the console application based at least in part on the monitored memory usage and console application state.

In some embodiments, managing the memory allocation for the console application includes the system to allocate each of the plurality of workspaces into one of the following states: full rendering of a workspace component in memory; caching of at least a portion of metadata and data for the workspace in a cache memory; or uncached with metadata and data for the workspace to be downloaded from the server.

In some embodiments, the system is further to determine whether the second workspace is fully rendered, cached, or uncached; and render the second workspace from a workplace component in memory if the second workspace is fully rendered, from at least some metadata and data retrieved from the cache if the second workspace is cached, or from metadata and data retrieved from the server if the second workspace is uncached.

In some embodiments, managing the memory allocation of the console application includes determining whether a workspace is to be removed from the memory or the cache.

In some embodiments, the system is further to perform memory usage analytics to identify one or more of the plurality of workspaces to be removed from memory.

In some embodiments, operation of the memory usage analytics is to occur in response to a memory usage for the memory console being greater than or equal to a threshold level.

In some embodiments, the memory usage analytics includes application of a Least Recently Used algorithm.

In some embodiments, the memory usage analytics includes operations being scheduled when the console application is in an idle state.

In some embodiments, a method includes downloading records for a console application from a server for a set of one or more of a plurality of workspaces and opening the set of workspaces in response to request by a user; switching an active workspace for the console application from a first workspace to a second workspace of the plurality of workspaces in response to a request from the user; monitoring memory usage for the plurality of workspaces; monitoring a state of the console application; and managing memory allocation for the console application based at least in part on the monitored memory usage and console application state.

In some embodiments, managing the memory allocation for the console application includes allocating each of the plurality of workspaces into one of the following states: full rendering of a workspace component in memory; caching of at least a portion of metadata and data for the workspace in a cache memory; or uncached with metadata and data for the workspace to be downloaded from the server.

In some embodiments, the method further includes determining whether the second workspace is fully rendered, cached, or uncached; and rendering the second workspace from a workplace component in memory if the second workspace is fully rendered, from at least some metadata and data retrieved from the cache if the second workspace is cached, or from metadata and data retrieved from the server if the second workspace is uncached.

In some embodiments, managing the memory allocation of the console application includes determining whether a workspace is to be removed from the memory or the cache.

In some embodiments, the method further includes performing memory usage analytics to identify one or more of the plurality of workspaces to be removed from memory.

In some embodiments, performing memory usage analytics includes determining whether memory usage for the memory console is greater than or equal to a threshold level.

Figure 9:
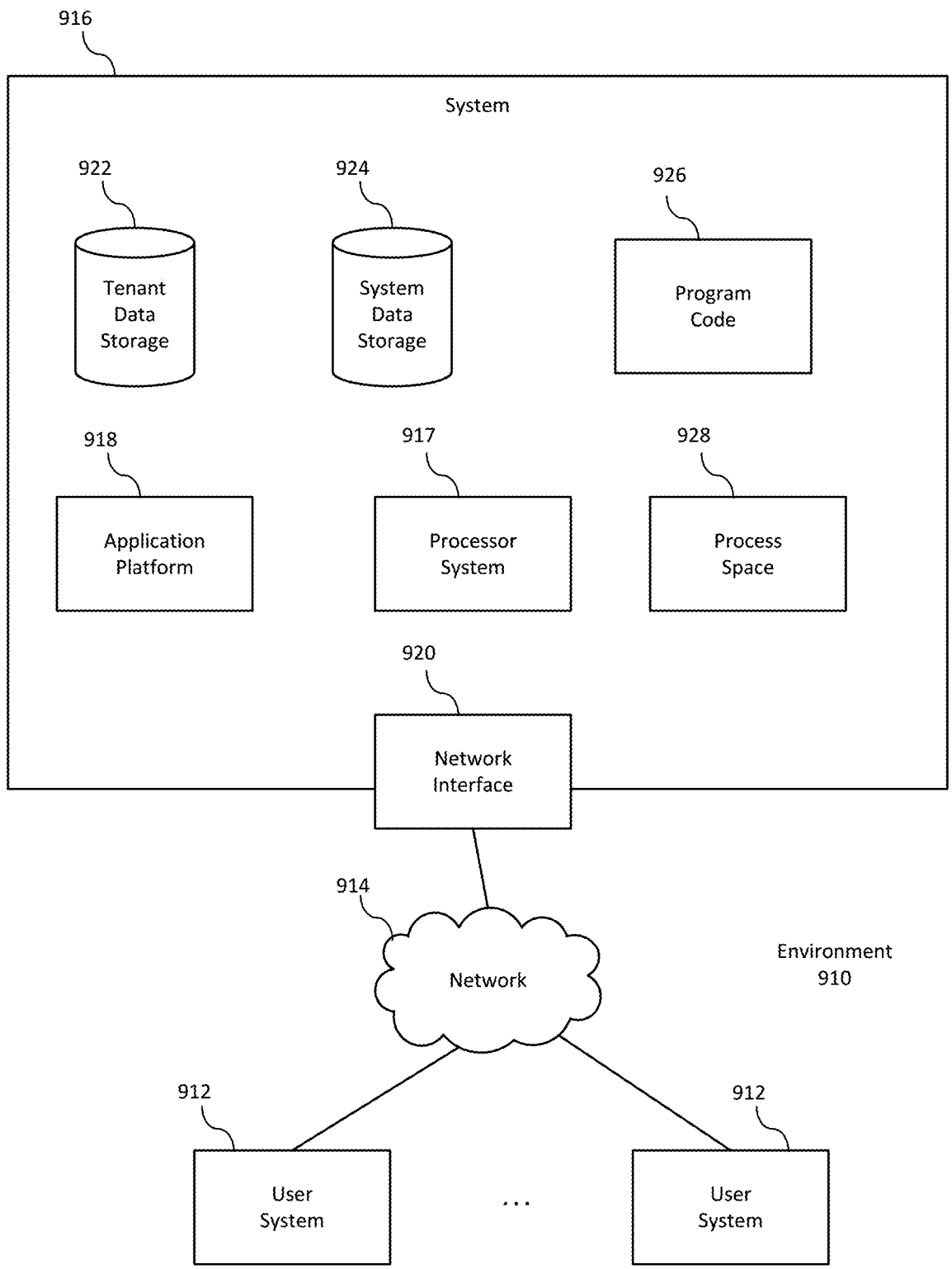
FIG. 9 illustrates a block diagram of an environment in which client-side memory management in component-driven console applications may be provided.

FIG. 9 illustrates a block diagram of an environment in which client-side memory management in component-driven console applications may be provided. In some embodiments, the environment 910 includes provision of memory management for component-driven console applications for as illustrated in FIGS. 1-8. The environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a smart phone, a laptop or tablet computer, a work station, and/or a network of computing devices. As illustrated in herein FIG. 9 and in more detail in FIG. 9, user systems 912 may interact via a network 914 with an on-demand database service, such as system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" may be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third-party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third-party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop or tablet computer, smart phone, or any wireless access protocol (WAP) enabled device or any other computing device capable of interfacing directly or indirectly to the Internet or other network connection. User system 912 typically runs an HTTP client, e.g., a browsing program (also referred to as a web browser or browser), such as Edge or Internet Explorer from Microsoft, Safari from Apple, Chrome from Google, Firefox from Mozilla, or a WAP-enabled browser in the case of a smart phone or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, touch pad, touch screen, pen, voice interface, gesture recognition interface, or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Core series processor or the like. Similarly, system 916 (and additional instances of an MTS, where more than one is present) and all of their components might be operator configurable using application(s) including computer code to run using a central processing unit such as processor system 917, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk or solid state drive (SSD), but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
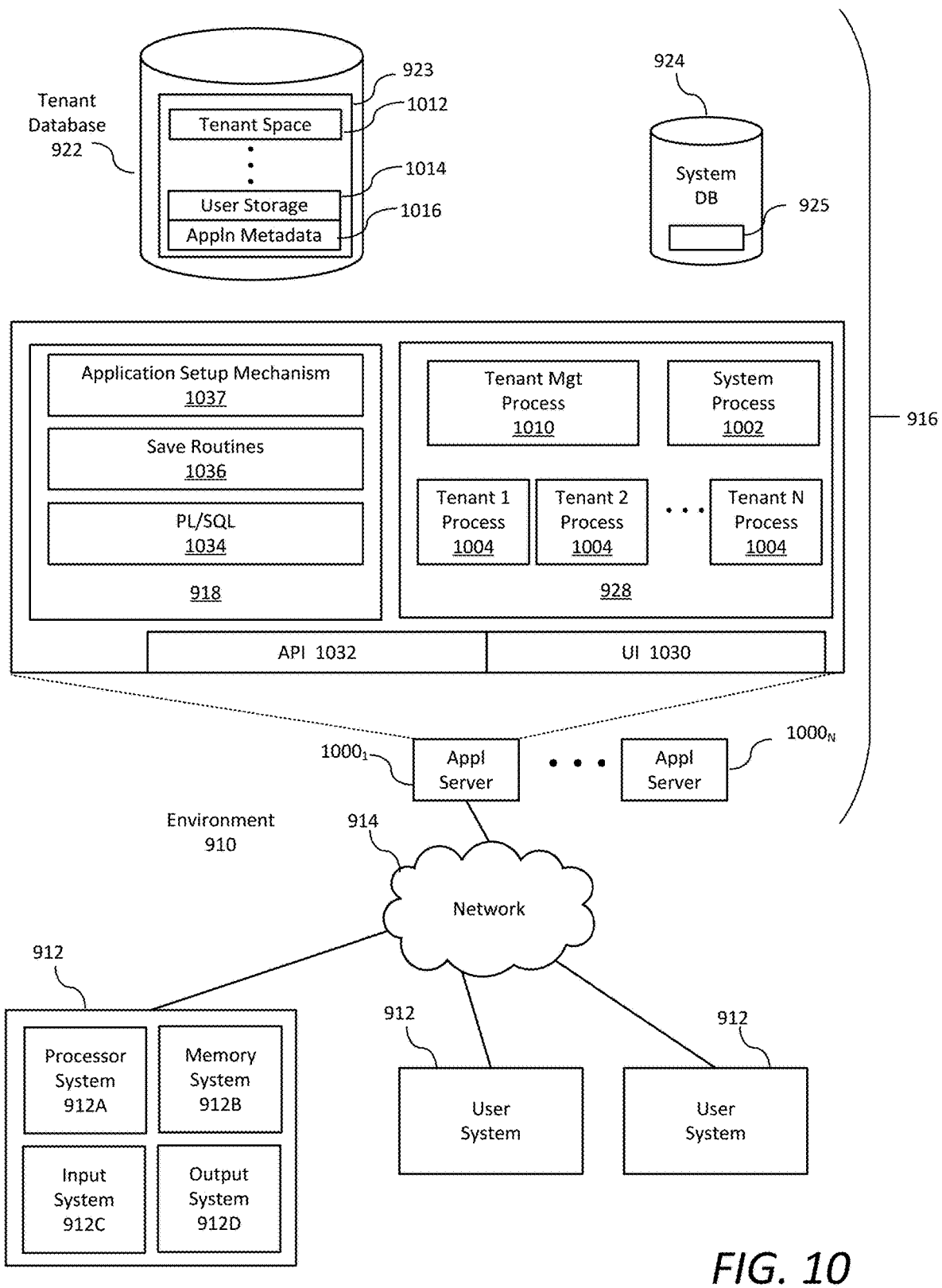
FIG. 10 illustrates further details of an environment in which an on-demand database service may be provided.

FIG. 10 illustrates further details of an environment in which an on-demand database service may be provided. FIG. 10 provides further detail regarding elements of system 916. In addition, various interconnections in an embodiment are provided. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long-term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 BIG-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, with U.S. Pat. No. 7,779,039, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described but can be practiced with modification and alteration within the spirit and scope of the appended claims. The description is thus to be regarded as illustrative instead of limiting.

What is claimed is:

1. One or more non-transitory computer-readable storage mediums having stored thereon executable computer program instructions that, when executed by one or more processors, cause the one or more processors to perform operations comprising:
performing processing of a console application for a plurality of workspaces on an apparatus, the processing of the console application including:
downloading records from a server for a set of one or more of a plurality of workspaces and opening the set of workspaces in response to request by a user, and
switching an active workspace from a first workspace to a second workspace of the plurality of workspaces in response to a request from the user, wherein switching includes:
requesting a rendered workspace component for the second workspace from a component cache in a memory of the apparatus to render the second workspace,
upon determining a workspace component for the second workspace is not contained in the component cache, requesting metadata and data for the second workspace from a cache memory of the apparatus to render the second workspace, and
upon determining that metadata and data for the second workspace are not contained in the cache memory, requesting metadata and data for the second workspace from the server to render the second workspace;
monitoring memory usage for the plurality of workspaces and monitoring a state of the console application; and
managing memory allocation for the console application based at least in part on the monitored memory usage and console application state.

2. The one or more storage mediums of claim 1, wherein managing the memory allocation for the console application includes allocating each of the plurality of workspaces into one of the following states:
full rendering of a workspace component for the workspace in the component cache of the memory;
caching of at least a portion of metadata and data for the workspace in the cache memory; or
uncached with metadata and data for the workspace to be downloaded from the server.

3. The one or more storage mediums of claim 2, wherein managing the memory allocation of the console application includes determining whether a workspace is to be removed from the component cache in memory or from the cache memory.

4. The one or more storage mediums of claim 3, wherein the executable computer program instructions further cause the one or more processors to perform operations comprising:
performing memory usage analytics to identify one or more of the plurality of workspaces to be removed from the component cache in the memory or from the cache memory, including:
removing a workspace component from the component cache based at least in part on a first time threshold, and
removing workspace metadata and data from the cache memory based at least in part on a second time threshold, the second time threshold being longer than the first time threshold.

5. The one or more storage mediums of claim 4, wherein operation of the memory usage analytics is to occur in response to a memory usage for the console application being greater than or equal to a usage threshold level.

6. The one or more storage mediums of claim 4, wherein the memory usage analytics includes application of a Least Recently Used algorithm.

7. The one or more storage mediums of claim 4, wherein the memory usage analytics includes scheduling operations when the console application is in an idle state.

8. The one or more storage mediums of claim 1, wherein the executable computer program instructions further cause the one or more processors to perform operations comprising:
upon determining that metadata for the second workspace is contained in the cache memory and data for the second workspace is not contained in cache memory, requesting workspace data for the second workspace from the server to utilize with the workspace metadata in the cache memory to render the second workspace.

9. A system comprising:
one or more processors;
a memory to store data, including data for a console application, the memory including a component cache for the console application; and
a cache memory, the cache memory including a metadata and data cache for the console application;
wherein the system is to provide memory management for the console application, including the system to:
download records from a server for a set of one or more of a plurality of workspaces and opening the set of workspaces in response to request by a user,
switch an active workspace from a first workspace to a second workspace of the plurality of workspaces in response to a request from the user, wherein switching includes the system to:
request a rendered workspace component for the second workspace from a component cache in the memory to render the second workspace,
upon determining a workspace component for the second workspace is not contained in the component cache, request metadata and data for the second workspace from the cache memory to render the second workspace, and
upon determining that metadata and data for the second workspace are not contained in the cache memory, request metadata and data for the second workspace from the server to render the second workspace,
monitor memory usage for the plurality of workspaces, monitor a state of the console application, and
manage memory usage for the console application based at least in part on the monitored memory usage and console application state.

10. The system of claim 9, wherein managing memory usage for the console application includes the system to allocate each of the plurality of workspaces into one of the following states:
full rendering of a workspace component for the workspace in the component cache of the memory;
caching of at least a portion of metadata and data for the workspace in the cache memory; or uncached with metadata and data for the workspace to be downloaded from the server.

11. The system of claim 10, wherein managing the memory allocation of the console application includes determining whether a workspace is to be removed from the component cache in the memory or from the cache memory.

12. The system of claim 11, wherein the system is further to perform memory usage analytics to identify one or more of the plurality of workspaces to be removed from the component cache in the memory or from the cache memory, including:
removing a workspace component from the component cache based at least in part on a first time threshold, and
removing workspace metadata and data from the cache memory based at least in part on a second time threshold, the second time threshold being longer than the first time threshold.

13. The system of claim 12, wherein operation of the memory usage analytics is to occur in response to a memory usage for the console application being greater than or equal to a usage threshold level.

14. The system of claim 12, wherein the memory usage analytics includes application of a Least Recently Used algorithm.

15. The system of claim 12, wherein the memory usage analytics includes the system to schedule operations when the console application is in an idle state.

16. A method comprising:
downloading records for a console application from a server for a set of one or more of a plurality of workspaces and opening the set of workspaces in response to request by a user;
switching an active workspace for the console application from a first workspace to a second workspace of the plurality of workspaces in response to a request from the user, wherein switching includes:
requesting a rendered workspace component for the second workspace from a component cache in a memory of a computing system to render the second workspace,
upon determining a workspace component for the second workspace is not contained in the component cache, requesting metadata and data for the second workspace from a cache memory of the computing system to render the second workspace, and
upon determining that metadata and data for the second workspace are not contained in the cache memory, requesting metadata and data for the second workspace from the server to render the second workspace;
monitoring memory usage for the plurality of workspaces;
monitoring a state of the console application; and
managing memory allocation for the console application based at least in part on the monitored memory usage and console application state.

17. The method of claim 16, wherein managing the memory allocation for the console application includes allocating each of the plurality of workspaces into one of the following states:
full rendering of a workspace component for the workspace in the component cache of the memory;
caching of at least a portion of metadata and data for the workspace in the cache memory; or
uncached with metadata and data for the workspace to be downloaded from the server.

18. The method of claim 17, wherein managing the memory allocation of the console application includes determining whether a workspace is to be removed from the component cache in the memory or from the cache memory.

19. The method of claim 18, further comprising:
performing memory usage analytics to identify one or more of the plurality of workspaces to be removed from the component cache in memory or from the cache memory, including:
removing a workspace component from the component cache based at least in part on a first time threshold, and
removing workspace metadata and data from the cache memory based at least in part on a second time threshold, the second time threshold being longer than the first time threshold.

20. The method of claim 19, wherein performing memory usage analytics includes determining whether memory usage for the console application is greater than or equal to a usage threshold level.

* * * * *